United States Patent [19]
Witt et al.

[11] Patent Number: 5,059,818
[45] Date of Patent: Oct. 22, 1991

[54] SELF-REGULATING CLOCK GENERATOR

[75] Inventors: David B. Witt; Brian D. McMinn, both of Austin, Tex.

[73] Assignee: Advanced Micro Devices, Inc., Sunnyvale, Calif.

[21] Appl. No.: 532,311

[22] Filed: Jun. 1, 1990

[51] Int. Cl.[5] .......................... H03K 5/13; H03K 7/00
[52] U.S. Cl. .................................. 307/269; 307/265; 307/480; 328/63
[58] Field of Search ............... 307/265, 267, 268, 269, 307/480; 328/63, 72, 74; 364/200, 270

[56] References Cited

U.S. PATENT DOCUMENTS

| | | | |
|---|---|---|---|
| 3,454,884 | 7/1969 | Ziehm | 307/267 |
| 4,794,281 | 12/1988 | Onodera et al. | 307/605 |
| 4,968,907 | 11/1990 | Pepper | 328/63 |
| 4,985,639 | 1/1991 | Renfrow et al. | 307/268 |
| 4,994,687 | 2/1991 | Fuji et al. | 307/267 |

Primary Examiner—Stanley D. Miller
Assistant Examiner—Sinh N. Tran
Attorney, Agent, or Firm—Foley & Lardner

[57] ABSTRACT

There is disclosed a self-regulating clock generator for providing an output clock signal to clock a CMOS microprocessor. The output clock signal has first and second phases of sufficient length to accommodate microprocessor speed paths and is provided in response to an input clock signal having a frequency and a duty cycle within a wide range of frequencies and duty cycles. The clock generator includes a latch arranged to be set and reset by the input clock signal and having an output for providing the output clock signal. A delay circuit is coupled to the latch output and enables the setting and resetting of the latch to establish the phase lengths. Also disclosed is a second clock generator which includes a pair of latches and a pair of delay circuits for providing an output clock signal having first and second phases of different lengths.

15 Claims, 2 Drawing Sheets

SELF-REGULATING CLOCK GENERATOR

BACKGROUND OF THE INVENTION

The present invention relates generally to integrated circuits and more particularly to complimentary metal oxide semiconductor (CMOS) integrated circuits. The present invention more particularly relates to clock generators for clocking CMO integrated circuit microprocessors which provide a clock signal having first and second phases of sufficient duration to accommodate internal microprocessor delays resulting from microprocessor speed paths.

CMOS integrated circuit microprocessors, for proper operation thereof, generally must be clocked by a clock signal having a first phase and a second phase for each clock cycle period. The clock signal first phase is at a high level for a first execution time period and the second phase is at a low level for a second execution time period to complete each clock cycle. The reason for this clocking procedure is that CMOS integrated circuits include circuitry wherein a first portion of the circuitry is active during the high level first phase of the clock signal and the other or second portion of the circuitry is active during the low level second phase of the clock signal.

The first and second phases of each clock signal cycle must be of sufficient duration to enable both portions of the microprocessor circuitry to complete their execution. Each such portion requires some finite minimum execution time because of internal microprocessor delays resulting from internal speed paths. The speed paths for each portion need not be, and generally are not, uniform. Hence, the first circuitry portion may have speed paths which are longer than the speed paths of the second circuitry portion, requiring the first clock signal phase to be longer than the second clock signal phase.

In addition to the foregoing, the internal speed paths and resulting first and second minimum execution time periods are greatly affected by integrated circuit processing parameters, microprocessor operating temperature, and microprocessor operating supply voltage. For example, microprocessors execute more slowly as operating temperature increases. Microprocessors also execute more slowly as the operating supply voltage decreases. In either or both of these cases, the duration of the first and second clock signal phases must be extended to provide first and second execution times which are sufficient to accommodate the increased first and second minimum execution time periods.

From the foregoing, it can be appreciated that if the first and second clock corresponding first and second minimum execution time periods, the microprocessor being clocked will not function properly because it will not have sufficient time during one or both of the first or second phases to complete its executions. This condition can occur if the clock signal frequency is too high or if the duty cycle of the clock signal represented by the duration of the first and second phases is expressively skewed resulting in one of the phases being shorter in duration than its corresponding minimum execution time period.

Clock generators for providing such clock signals are generally provided "on chip" in CMOS microprocessor devices. However, they develop the clock signal or signals in response to input clock signals generated by external clock sources. The on chip clock generators must be arranged to provide the clock signal first and second phase durations because the external clock sources cannot always be relied upon to provide such clock signals. In fact, the external clock sources usually provide input clock signals at a frequency and duty cycle in a wide range and which do not allow for changes in microprocessor operating speed. It is therefore required that the on chip clock generators be able to derive the clock signals for clocking the microprocessor responsive to input clock signals having a wide range of frequencies and duty cycles.

One common on chip circuit arrangement for providing appropriate clock signals has included phase-locked loops. Phase-locked loops, while being generally successful in this regard, do suffer from a number of disadvantages. Such circuits are expensive to implement because they require a high number of components and thus occupy a considerable portion of the integrated circuit die area. Also, phase-locked loops do not accommodate as wide a range of input clock signal duty cycles and frequencies which might be desired. Furthermore, phase-locked loops require some degree of start-up time to generate the proper clock signals after power is initially applied to the microprocessors utilizing such circuitry.

Another method is to employ internal circuitry for dividing down an externally applied 2X clock signal to derive a 1X clock having the desired duty cycle. The problem with this technique however is that 2X clocks are much more expensive and difficult to implement, especially as clock frequencies increase.

Hence, there is a need in the art for an improved self-regulating clock generator which may be incorporated in chip in CMOS devices such as microprocessors. Preferably, the improved clock generator should incorporate fewer components than phase-locked loops resulting in less die area and hence less implementation cost. Further, the improved clock generator should be able to generate suitable first and second clock signal phases without the need of a 2X clock and from the time in which power is initially applied to such devices without a start-up time. The improved clock generator should also be more tolerant to instantaneous external input clock signal frequency and duty cycle variations, and variations in microprocessor operating speed as a result of changes in temperature or supply voltages, for example.

SUMMARY OF THE INVENTION

The invention therefore provides a clock generator for providing an output clock signal for clocking a microprocessor having first and second speed paths requiring first and second minimum execution time periods wherein the output clock signal has, during each period, a first phase to establish a first execution time period for the processor sufficient to accommodate a first speed path during the first phase and a second phase to establish a second execution time period for the processor sufficient to accommodate the second speed path during the second phase. The output clock signal is provided responsive to an externally applied input clock signal having a frequency and a duty cycle within a wide range of frequencies and duty cycles. The clock generator includes latch means having an input arranged to receive the input clock signal and an output, and is also arranged to be set and reset by the input clock signal, when enabled, for providing the output clock signal at the output and enable means coupled to the latch means to enable the setting and resetting of the latch means by the input clock signal after the first and second execution time periods have elapsed.

The present invention further provides a self-regulating clock generator for generating an output clock signal for clocking a microprocessor having speed paths requiring minimum execution times wherein the output clock signal has a duty cycle and a frequency to provide execution times sufficient to accommodate the speed paths and is generated in response to an applied input clock signal having a frequency and duty cycle within a wide range of frequencies and duty cycles. The clock generator includes latch means having an output for providing the output clock signal and input conditioning means having a first input coupled to the input clock signal, a second input, and an output coupled to the latch means for setting and resetting the latch means to cause the latch means to provide the output clock signal. The clock generator further includes delay means coupled between the latch means output and the input conditioning means second input for delaying the application of the output clock signal to the input conditioning means second input by a time sufficient to accommodate the speed paths of the microprocessor.

The present invention still further provides a self-regulating clock generator for providing an output clock signal for clocking a microprocessor having speed paths requiring minimum execution times, wherein the output clock signal has, during each period, a first phase to provide the microprocessor with a first execution time sufficient to accommodate the speed paths during the first phase and a second phase to provide the microprocessor with a second execution time sufficient to accommodate the speed paths during the second phase. The output clock signal is provided in response to an input clock signal provided by an external clock source and having a frequency and duty cycle within a wide range of frequencies and duty cycles. The clock generator includes first latch means having a set input and a reset input arranged to be coupled to the external clock source and an output for providing the output clock signal including the first phase, second latch means having a set input and a reset input arranged to be coupled to the clock source and an output for providing the output clock signal second phase, and first delay means coupled between the first latch means output and the first latch means reset input and between the first latch means output and the second latch means set input for delaying the application of the output clock signal first phase to the first latch means reset input and the second latch means set input by a time period equal to the first execution time. The clock generator further includes second delay means coupled between the second latch means output and the second latch means reset input and between the second latch means output and the first latch means set input for delaying the application of the output clock signal second phase to the second latch means reset input and the first latch means set input by a time period equal to the second execution time. As a result, the first delay means establishes the first execution time and the second delay means establishes the second execution time during the first and second phases respectively of the output clock signal.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in the several figures of which like reference numerals identify identical elements, and wherein:

DETAILED DESCRIPTION OF THE PREFERRED EMBODIMENTS

Figure 1:
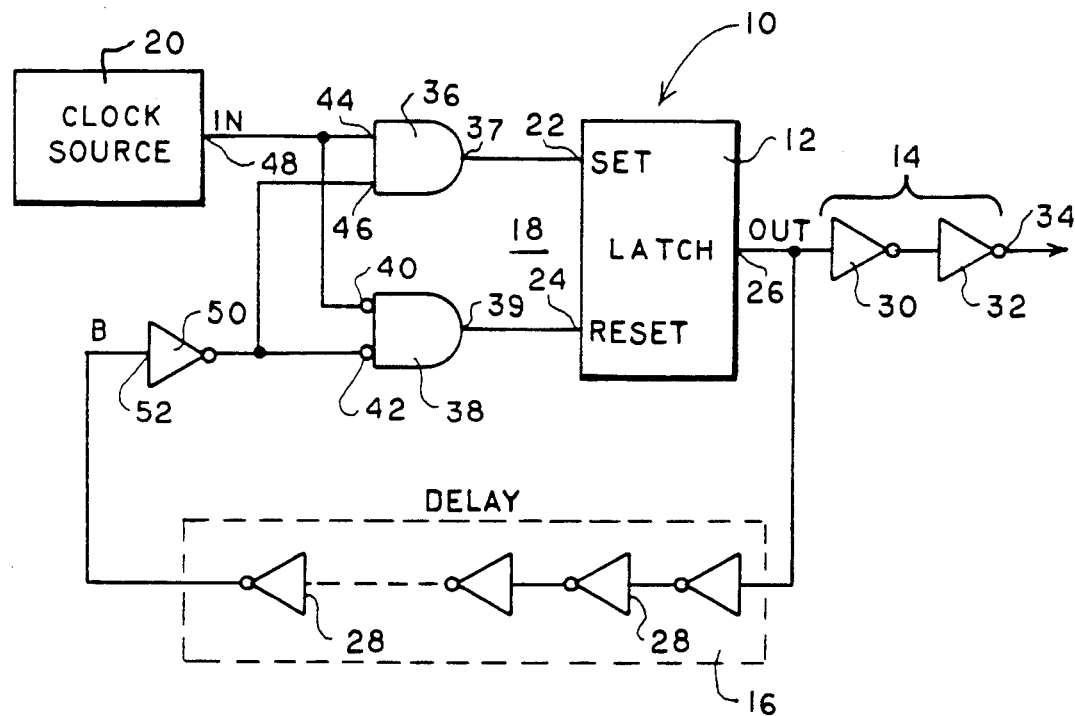
FIG. 1 is a schematic block diagram of a first clock generator embodying the present invention.

Referring now to FIG. 1, it illustrates a first clock generator 10 embodying the present invention. The clock generator 10 generally includes a latch 12, a buffering means 14, a delay means 16, and an input conditioning means 18 coupled to an external clock source 20.

The latch 12 includes a set input 22, a reset input 24, and an output 26. When the set input 22 is high and the reset input 24 is low, the latch 12 is set so that the output 26 is at a high level. Conversely, when the set input 22 is low and the reset input 24 is high, the latch is reset so that the output 26 is low. Such latches are well known in the art.

The delay means 16 comprises a plurality of serially coupled inverters 28. Each inverter corresponds to a delay proportional to an average gate delay of the integrated circuit in which the clock generator 10 is employed. The delay means 16 is coupled between the output 26 of latch 12 and the reset input 24 of the latch through the input conditioning circuit 14. The output clock signal is provided at the output 26 of latch 12 and is buffered by the buffering means 14. The buffering means 14 comprises a pair of inverters 30 and 32 which provide at the output 34 of inverter 32 the buffered output clock signal to be applied to the CMOS circuitry employed within the integrated circuit. The delay means serves to delay the application of the output clock signal at output 26 of latch 12 to the reset input 24 of the latch 12.

The input conditioning means 18 comprises an AND gate 36 and a NOR gate 38. The NOR gate 38 is in the form of an AND gate having a pair of inverting inputs, a first inverting input 40 and a second inverting input 42. The AND gate also includes a first input 44 and a second input 46. As will be noted in FIG. 1, the first input 40 of NOR gate 38 is coupled to the first input 44 of AND gate 36. The second input 42 of NOR gate 38 is coupled to the second input 46 of AND gate 36. The first input 44 of AND gate 36 and the first input 40 of NOR gate 38 are coupled to the external clock source 20 which provides at its output 48 an input clock signal having a frequency and a duty cycle within a wide range of frequencies and duty cycles from which the output clock signal is derived at output 34 of inverter 32 and output 26 of latch 12. The delay means 16 is coupled to the second input 46 of AND gate 36 and the second input 42 of NOR gate 38 through and inverter 50. To that end, inverter 50 has an input 52 coupled to the delay means 16. The applied delayed output clock signal through delay means 16 is applied to the input 52 of inverter 50 and is denoted by a "B", which corresponds to the waveform B of FIG. 2 which will be referred to hereinafter. Also, AND gate 36 includes an output 37 coupled to set input 22 of latch 12 and NOR gate 38 has an output 39 coupled to the reset input of latch 12.

As previously mentioned, the CMOS microprocessor to be clocked by the output clock signal includes a first circuit portion which is active during a first phase of the output clock signal when the output clock signal is at a high level and a second circuit portion which is active during a second phase of the output clock signal when the output clock signal is at a low level. Each circuit portion includes a speed path formed by internal gate delays which result in minimum first and second execution times during the first and second phases to enable each circuit portion to complete its execution during its respective output clock signal phase.

As will be seen hereinafter, the input clock signal provided by external source 80 sets and resets the latch 62 to cause the latch 62 to provide the output clock signal. However, the input clock signal only sets and resets the latch 62 when the latch is set or reset enabled by the output of the delay means 16. Hence, the number of inverters 28 selected for delay means 16 should represent a delay time at least equal to the greater of the first and second minimum execution times. By so doing, each phase of the output clock signal will be assumed to provide a sufficient execution time to accommodate the speed paths of both circuit portions.

Hence, the delay time of the delay means 16 assumes a minimum execution time for each phase of the output clock signal. The actual duration of each phase may be longer than the minimum execution times required by the processor because the input clock signal may define first or second phases which are longer than the delay time of the delay means 16. If one of the phases defined by the input clock signal is longer than the delay time, the delay means 16 will have no effect because it would have already enabled the latch 62 to be set or reset by the time the input clock signal changes to the next phase.

It will also be appreciated that the clock generator 10 is also self-regulating. The self-regulation comes into play because the delay means is arranged to vary its delay time in direct relation to the delay time represented by the microprocessor speed paths. This results because the delay means 16 includes a plurality of serially coupled inverters with each inverter representing a delay proportional to an average gate delay of the microprocessor. Hence, the same parameters such as processing parameters, temperature, and supply voltage magnitude, for example, which vary the delay time of the speed paths will have the same effect on the delay time of the delay means 16.

Figure 2:
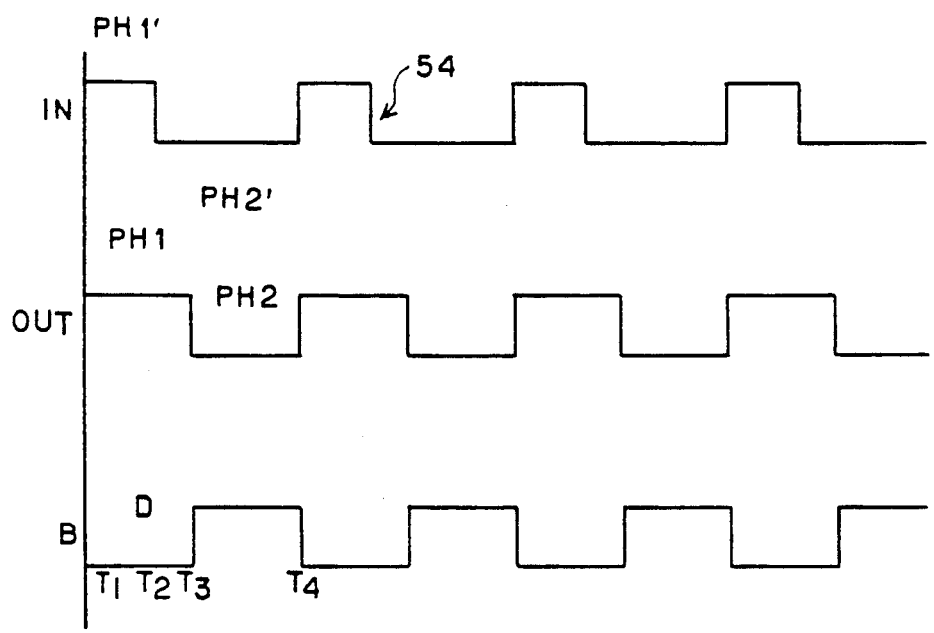
FIG. 2 is a plurality of waveforms illustrating the manner in which the clock generator of FIG. 1 generates a fifty percent duty cycle clock signal in response to an input clock signal having a duty cycle other than a fifty percent duty cycle.

The operation of the clock generator illustrated in FIG. 2 is for a case where the input clock signal 54 results in a 50% duty cycle output clock signal. However, the duty cycle of the input clock signal is skewed so that the first phase, PH1', is shorter than the second phase, PH2', and is also shorter than the minimum execution time of the microprocessor during the first phase.

The delay means 16 provides a delay time D which is sufficient to accommodate the speed paths of both circuit portions. Hence, as will be seen hereinafter, the output clock signal will have first and second phases at least equal D.

In operation, when the input clock signal at output 48 of clock source 12 is high, and the latch 12 is set enabled by the delayed output clock signal at input 52 of inverter 50 being low, the set input 22 of latch 12 is correspondingly high and the reset input 24 of latch 12 is correspondingly low to set latch 12 and cause the output 26 to be high. When the input clock signal is at a low level and the latch 12 is set enabled by the delayed output clock signal at input 52 of inverter 50 being high, the set input 22 of latch 12 is correspondingly low and the reset input 24 of latch 12 is correspondingly high to reset latch 12 and cause the output 26 of latch 12 to be low. FIG. 2 illustrates the manner in which the clock generator 10 generates the first and second phases of sufficient duration.

The input clock signal waveform 54 indicates that the input clock signal has a period of T and a duty cycle of thirty-three percent. Upon initial start-up at time T1, the input clock signal is at a high level and the delayed output clock signal at input 52 of inverter 50 is at a low level to cause the latch 12 to be set and the output to be at a high level. At time T2, the input clock signal goes low but since the output clock signal applied to the input 52 of inverter 50 is delayed by one-half of the period T, the input 52 of inverter 50 is still low so that the output 26 of latch 12 remains unchanged. At time T3, the input 52 of inverter 50 goes high by virtue of the one-half period delay provided by the delay means 16. Hence, at time T3, the input clock signal is low and the latch 12 is reset enabled by the input 52 of inverter 50 being high to reset the latch 12 and cause the output 26 to go low. The output 26 of latch 12 remains low until time T4 when the input clock signal once again goes high and the input 52 of inverter 50 goes low by virtue of the one-half period delay of the output clock signal. The foregoing repeats during each full period of the input clock signal for generating the output clock signal having the first and second phases PH1 and PH2 at the output 26 of latch 12. The first and second phases PH1 and PH2 are sufficiently long in duration to accommodate the speed paths of the microprocessor for both phases. The output clock signal is buffered by the inverters 30 and 32 for application to the CMOS microprocessor circuitry within which the clock generator 10 is utilized.

Figure 3:
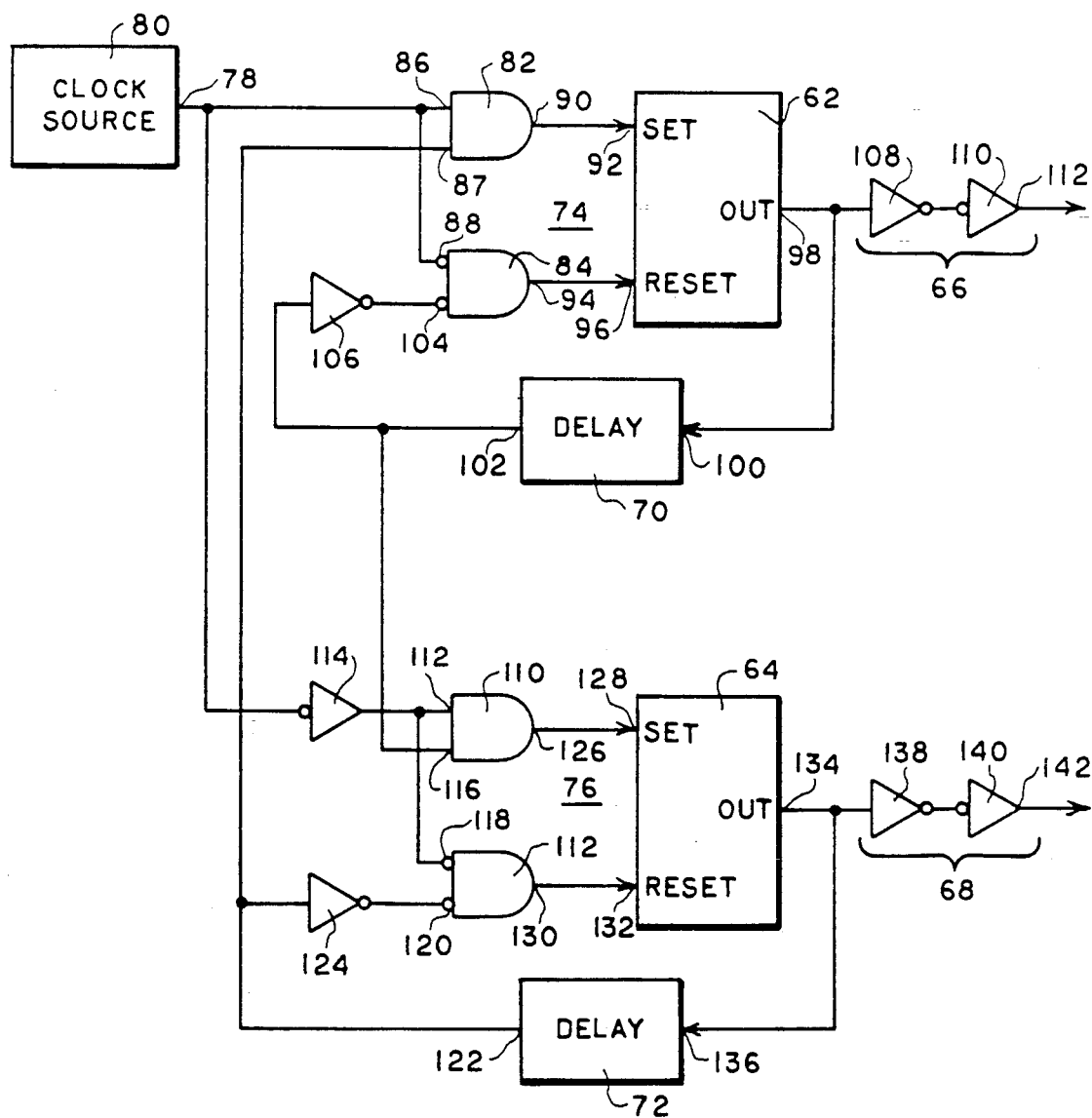
FIG. 3 is a schematic block diagram of another clock generator structured in accordance with a second preferred embodiment of the present invention.

Referring now to FIG. 3, it illustrates another clock generator 60 embodying the present invention. The clock generator 60 is arranged for providing an output clock signal having a tailored duty cycle with the first phase being unequal to the second phase in duration. The clock generator 60 generally includes a first latch 62, a second latch 64, a first buffering means 66, a second buffering means 68, a first delay means 70, a second delay means 72, a first input conditioning circuit 74 and a second input conditioning circuit 76. The clock generator 60 is coupled to the output 78 of an external clock source 80 which provides the clock generator 60 with input clock signals.

The first input conditioning circuit 74 includes an AND gate 82 and a NOR gate 84. The AND gate 82 has a first input 86 which is coupled to the output 78 of clock source 80 and a first input 88 of NOR gate 84. The output 90 and AND gate 82 is coupled to the set input 92 of latch 62 and the output 94 of NOR gate 84 is coupled to the reset input 96 of latch 62.

Latch 62 includes an output 98 which is coupled to the input 100 of delay means 70 which in turn has an output 102 coupled to the second input 104 of NOR gate 84 through an inverter 106. The first buffering means 66 which is coupled to the output 98 of latch 62 comprises a pair of serially coupled inverters 108 and 110 which provide at the output 112 of inverter 110 the buffered output clock signal.

The second input conditioning circuit 76 also includes an AND gate 110 and a NOR gate 112. AND gate 110 has a first input 112 which is coupled to the output 78 of the external clock source 80 through an inverter 114. AND gate 110 also has a second input 116 which is coupled to the output 102 of the delay means 70.

NOR gate 112 has a first input 118 which is coupled to the output 78 of the external clock source through the inverter 114. NOR gate 112 also has a second input 120 which is coupled to the output 12 of delay means 72 through an inverter 124.

AND gate 110 includes an output 126 which is coupled to the set input 128 of the second latch 64. NOR gate 112 has an output 130 which is coupled to the reset input 132 of the second latch 64.

The second latch has an output 134 which is coupled to the input 136 of the delay means 72 and to the second buffering means 68. The second buffering means 68 includes a pair of serially coupled inverters 138 and 140 for providing at the output 142 of inverter 140 a buffered second output clock signal which is the inverse of the output clock signal provided at output 112. Lastly, the output 122 of the second delay means 72 is coupled to the second input 87 of AND gate 82.

As can thus be seen, the first delay means 70 is coupled between the output 98 of latch 62 and the reset input 96 of the first latch 62 and the set input 78 of the second latch 64. The second early means 72 is coupled between the output 134 of the second latch 64 and the reset input 132 of the second latch 64 and the set input 92 of the first latch 62. The delay means 70 and 72 may comprise different plurality of serially coupled inverters to provided respective different delay times. Hence, each of the delay means 70 and 72 is arranged to delay the first and second phases by a different delay time with the first relay means delaying the first phase and second delay means delaying the second phase.

The operation of the clock generator 60 is similar to that of the clock generator 10 of FIG. 1. The main difference is that the second delay means 72 set enables the latch 62 and the first delay means 70 set enables the second latch 64. The first latch 62 is reset enables by the first delay means 70 and the second latch is reset enabled by the second delay means 72. As a result, each latch, once set, is prevented from being cleared until the delay established by its corresponding delay means has passed. The resulting output clock signal at output 112 of inverter 110 will thus have a first phase established by the first delay means 70 and a second phase established by the second delay means 72. Because the first and second delay means are preferably a plurality of serially coupled inverters, they will exhibit the same self-regulatory properties previously described. Hence, first and second execution times during the first and second phases of sufficient length to accommodate the first and second speed paths will always be provided.

Like the clock generator 10 of FIG. 1 disclosed herein, the first and second delays 70 and 72 will only be asserted if needed. If the first or second phases of the input clock signal are longer than the first or second delay, the respective delay will already have set enabled the other latch so that the next phase of the input clock signal will pass through. The delays are only asserted if the input clock signal frequency is too high or the duty cycle is skewed to provide a phase which is shorter than one of the delay times.

The pulse-shaping characteristics of the clock generator of the present invention may be extended to multiphase clock signal generations. This is possible because, in general, phase n is set when both phase n − 1 is complete and the input is equal to state n and phase n is reset when both phase n is complete and the input is not equal to state n.

From the foregoing, it can be seen that the present invention provides new and improved clock generators for clocking CMOS microprocessors. The clock generators disclosed herein include circuit components which are compatible with CMOS technology and thus, may be readily incorporated into CMOS integrated circuit microprocessor devices. In addition, the clock generators of FIGS. 1 and 3 do not require any start-up time and are arranged to provide appropriate cycle clock signals upon being initially powered. Furthermore, the clock generators of FIG. 1 and 3 do not incorporate phase-locked loops which, as previously mentioned, have required a start-up time and have been relatively expensive to implement in integrated circuit devices, such as, CMOS integrated circuit microprocessor devices.

While particular embodiments of the present invention have been shown and described, modifications may be made, and it is therefore intended to cover in the appended claims all such changes and modifications which fall within the true spirit and scope of the invention.

What is claimed is:

1. A clock generator for providing an output clock signal for clocking a microprocessor having first and second speed paths requiring first and second minimum execution time periods, said output clock signal having, during each period, a first phase to establish a first execution time period for said processor sufficient to accommodate said first speed path during said first phase and a second phase to establish a second execution time period for said processor sufficient to accommodate said second speed path during said second phase, said output clock signal being provided responsive to an externally applied input clock signal having a frequency and a duty cycle within a wide range of frequencies and duty cycles, said clock generator comprising:

latch means having an input to receive said input clock signal and having an output said latch means being set and reset by said input clock signal for providing said output clock signal at said output; and enable means coupled between said latch means output and said latch means input, said enable means including a first delay means having a first delay time for establishing said first execution time period during said first phase and a second delay means having a second delay time for establishing said second execution time period during said second phase to enable the setting and resetting of said latch means by said input clock signal after said first and second execution time periods have elapsed, said latch means including a first latch which is reset enabled by said first delay means and set enabled by said second delay means and said latch means further including a second latch which is reset enabled by said second delay means and set enabled by said first delay means.

2. A clock generator as defined in claim 1 wherein the first and second delay means varies said first and second delay times in direct relation to variations in said first and second minimum execution time periods.

3. A clock generator as defined in claim 2 wherein said first and second delay means each comprise a plurality of serially coupled inverters.

4. A self-regulating clock generator for generating an output clock signal for clocking a microprocessor having speed paths requiring minimum execution times, said output clock signal having a duty cycle and a frequency to provide execution times sufficient to accommodate said speed paths and being generated in response to an applied input clock signal having a frequency and duty cycle within a wide range of frequencies and duty cycles, said clock generator comprising:
latch means having an output for providing said output clock signal;
input conditioning means including an AND gate having a first input coupled to said input clock signal, a second input, and an output coupled to said latch means and a NOR gate having a first input coupled to said input clock signal, a second input coupled to said AND gate second input and an output coupled to said latch means for setting and resetting said latch means to cause said latch means to provide said output clock signal; and
delay means coupled between said latch means output and to said AND gate and NOR gate second inputs of said input conditioning means for delaying the application of said output clock signal to said input conditioning means by a time sufficient to accommodate said speed paths of said microprocessor.

5. A clock generator as defined in claim 4 wherein said delay means delays the application of said output clock signal by a time which is in direct relation to variations in the minimum execution time of said processor.

6. A clock generator as defined in claim 5 wherein said delay means comprises a plurality of serially coupled inverters.

7. A clock generator as defined in claim 4 further comprising an inverter and wherein said NOR gate second input is coupled to said delay means by said inverter.

8. A clock generator as defined in claim 3 wherein said latch means includes a set input coupled to said AND gate output and a reset input coupled to said NOR gate output.

9. A clock generator as defined in claim 4 further comprising buffer means coupled to said latch means output for buffering said output clock signal.

10. A clock generator as defined in claim 9 wherein said buffer means comprises a pair of serially coupled inverters.

11. A self-regulating clock generator for providing an output clock signal for clocking a microprocessor having speed paths requiring minimum execution times, said output clock signal having, during each period, a first phase to provide said microprocessor with a first execution time sufficient to accommodate said speed paths during said first phase and a second phase to provide said microprocessor with a second execution time sufficient to accommodate said speed paths during said second phase, said output clock signal being provided in response to an input clock signal provided by an external clock source and having a frequency and a duty cycle within a wide range of frequencies and duty cycles, said clock generator comprising:
first latch means having a set input and a reset input coupled to said external clock source and an output for providing said output clock signal including said first phase;
second latch means having a set input and a rest input coupled to said clock source and an output for providing said output clock signal second phase;
first delay means coupled between said first latch means output and said first latch means reset input and between said first latch means output and said second latch means set input for delaying the application of said output clock signals first phase to said first latch means reset input and said second latch means set input by a time period equal to said first execution time; and
second delay means coupled between said second latch means output and said second latch means reset input and between said second latch means output and said first latch means set input for delaying the application of said output clock signal second phase to said second latch means rest input and said first latch means set input by a time period equal to said second execution time, whereby
said first delay means establishes said first execution time and said second delay means establishes said second execution time during said first and second phases respectively of said output clock signal.

12. A clock generator as defined in claim 11 wherein said first and second delay means delay the application of said first and second phases by a time which is in direct relation to variations in the minimum execution times of said processor.

13. A clock generator as defined in claim 12 wherein said first and second delay means each comprises a plurality of serially coupled inverters.

14. A clock generator as defined in claim 13 further comprising buffering means coupled to said first latch means output for buffering said output clock signal.

15. A clock generator as defined in claim 14 wherein said buffering means comprises a pair of serially coupled inverters.

* * * * *